(12) United States Patent
Costanzo et al.

(10) Patent No.: US 9,592,983 B2
(45) Date of Patent: Mar. 14, 2017

(54) MISSORT PREVENTION SYSTEM IN A CONVEYING SYSTEM

(71) Applicant: Laitram, L.L.C., Harahan, LA (US)

(72) Inventors: Mark Costanzo, River Ridge, LA (US); David Herbert Myers, River Ridge, LA (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/878,223

(22) Filed: Oct. 8, 2015

(65) Prior Publication Data

US 2016/0101957 A1    Apr. 14, 2016

Related U.S. Application Data

(60) Provisional application No. 62/063,016, filed on Oct. 13, 2014.

(51) Int. Cl.
| | |
|---|---|
| *B65H 7/20* | (2006.01) |
| *B65G 43/08* | (2006.01) |
| *B65G 47/44* | (2006.01) |
| *B65G 11/20* | (2006.01) |
| *B07C 3/00* | (2006.01) |
| *B07C 5/00* | (2006.01) |

(52) U.S. Cl.
CPC .......... *B65H 7/20* (2013.01); *B07C 3/00* (2013.01); *B07C 5/00* (2013.01); *B65G 11/203* (2013.01); *B65G 43/08* (2013.01); *B65G 47/44* (2013.01)

(58) Field of Classification Search
CPC ...... B65G 11/203; B65G 43/08; B65G 47/44; B65H 7/20; B07C 3/00; B07C 5/00
USPC ........... 198/502.1, 537, 358, 359; 193/2 R, 4
See application file for complete search history.

(56) References Cited

U.S. PATENT DOCUMENTS

| | | | | |
|---|---|---|---|---|
| 3,136,401 | A * | 6/1964 | Fisher | B65G 11/203 193/32 |
| 4,383,598 | A * | 5/1983 | Newman | B65G 13/075 193/35 A |
| 4,397,386 | A * | 8/1983 | Kampf | B65G 47/8815 193/32 |
| 5,056,647 | A * | 10/1991 | Rosenbaum | B65G 43/00 198/460.1 |
| 5,655,643 | A * | 8/1997 | Bonnet | B65G 47/766 198/370.08 |
| 5,794,789 | A * | 8/1998 | Payson | B07C 3/00 209/549 |
| 7,124,876 | B2 * | 10/2006 | Wolf | B65G 47/766 198/367 |
| 7,278,568 | B2 * | 10/2007 | Kadaba | B07C 3/008 235/375 |
| 9,192,965 | B2 * | 11/2015 | Serjeantson | B07C 3/08 |

* cited by examiner

*Primary Examiner* — Gene Crawford
*Assistant Examiner* — Keith R Campbell
(74) *Attorney, Agent, or Firm* — Catherine M. Bishop

(57) ABSTRACT

A missort prevention system prevents missorts in a sortation conveying system. The missort prevention system includes a sensor for detecting the presence of an unexpected article on a chute transitioning articles off of a conveyor and a missort preventer for blocking the further passage of the unexpected article on the chute.

12 Claims, 6 Drawing Sheets

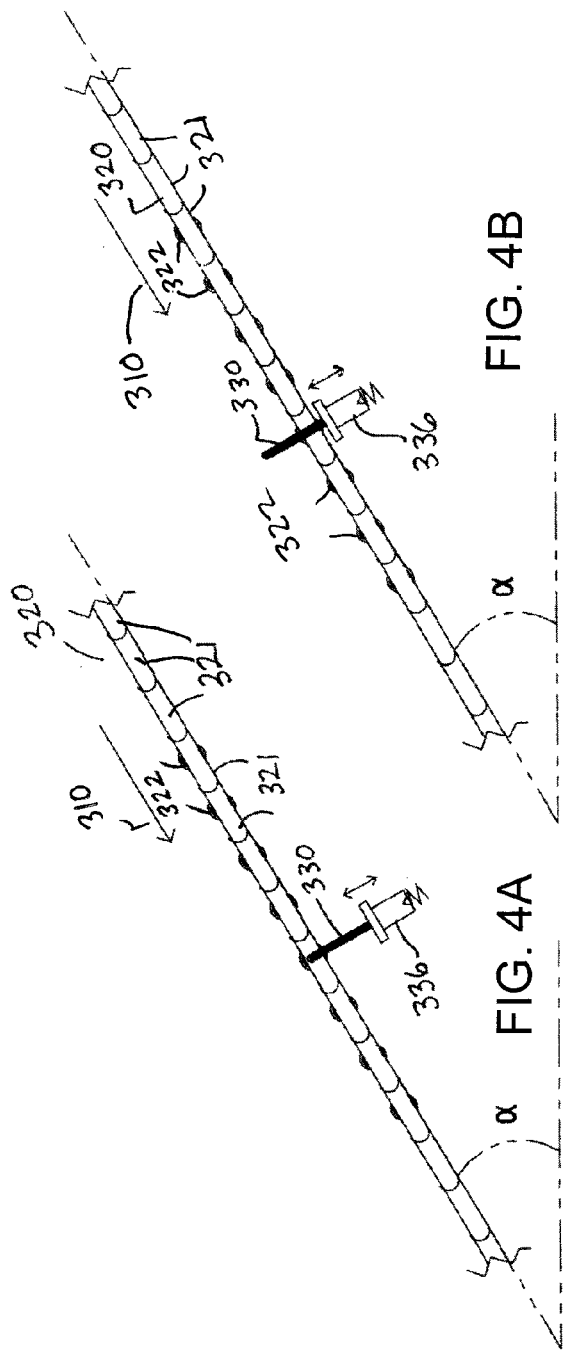
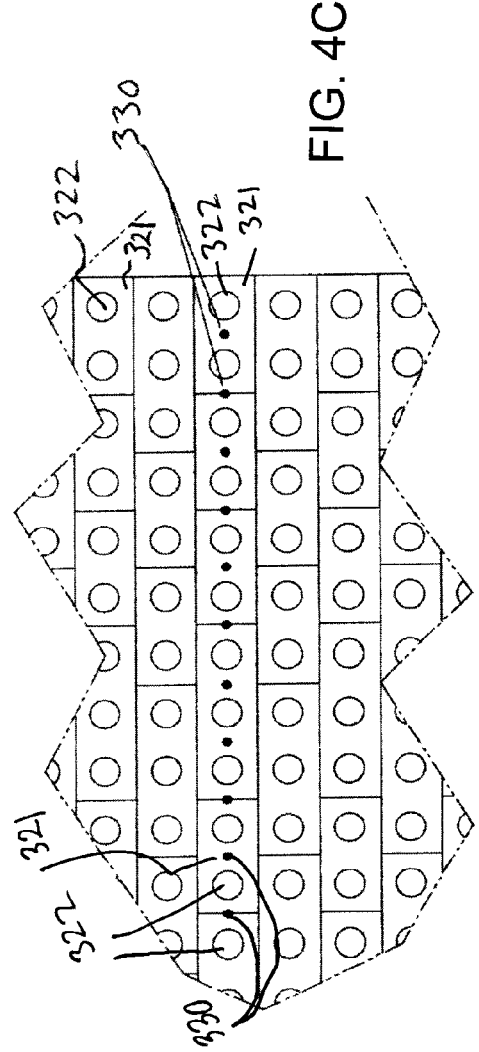

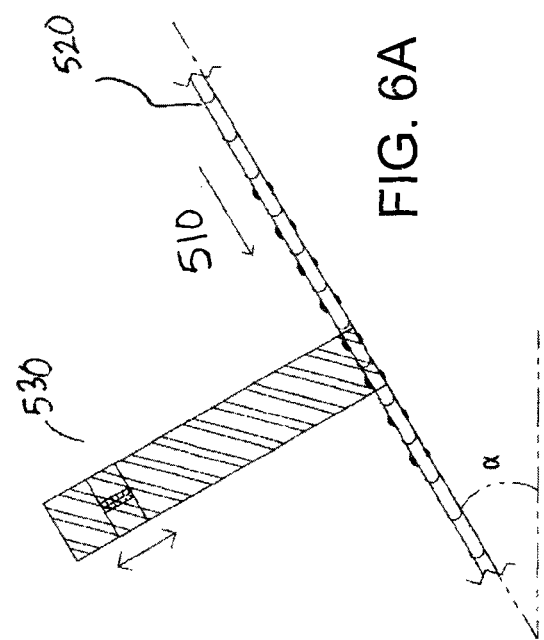
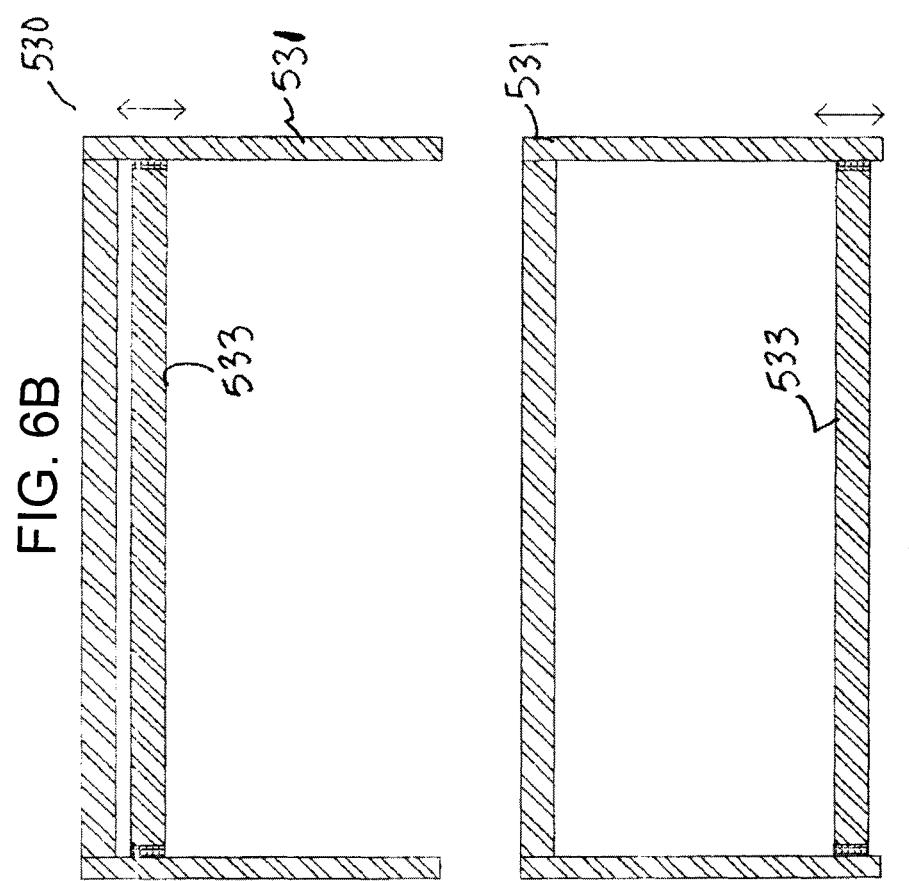

MISSORT PREVENTION SYSTEM IN A CONVEYING SYSTEM

RELATED APPLICATIONS

This application claims priority to U.S. provisional Patent Application Ser. No. 62/063,016, filed Oct. 13, 2014 and entitled "Missort Prevention System in a Conveying System", the contents of which are herein incorporated by reference.

FIELD OF THE INVENTION

The present invention relates to the field of power-driven conveyors. More particularly, the present invention relates to a sortation conveying system for preventing missorts.

BACKGROUND OF THE INVENTION

In mail processing systems and other applications involving sorting of articles, a main sorter conveys articles that are selectively sorted down chutes into bins or other collection devices. Costs are associated with the event of a missorted article. For example, if a sorter malfunctions and accidentally sends a package intended for Chicago to another bin or bag location, the Chicago-bound package may be shipped to another city, incurring added costs, late fees, penalties and-or dissatisfied customers. To prevent this problem, some sorter manufacturers have added a method for sensing the missorted package and sounding an alarm or warning light. In this situation, an operator must search through a full bin or bag to find and remove the missorted article, resulting in inefficient sorting and potential human error.

SUMMARY OF THE INVENTION

A missort prevention system prevents missorts in a sortation conveying system. The missort prevention system includes a sensor for detecting the presence of an unexpected article on a chute transitioning articles off of a conveyor and a missort preventer for blocking the further passage of the unexpected article on the chute and into the wrong bin or bag.

According to one aspect, a method of preventing a missorted article from passing down a chute from a conveyor is provided. The method comprises the steps of sensing the presence of a missorted article on a chute and activating a missort preventer along the chute to block the missorted article.

According to another aspect, a conveying system for sorting articles is provided. The conveying system comprises a conveyor for conveying articles in a direction of travel, a first chute extending at an angle down from the side of the conveyor for receiving articles sorted off of the conveyor, a missort sensor associated with the chute for detecting the presence of an article on the chute, and a missort preventer for selectively blocking the chute when the missort sensor senses a missorted article on the chute.

According to another aspect, a method of sorting articles is provided. The method comprises the steps of directing the articles along a path of travel with a conveyor, detecting the presence of a characteristic of the articles, directing articles with a first characteristic from the conveyor to a first chute and blocking the first chute if an article without the first characteristic is directed down the first chute.

BRIEF DESCRIPTION OF THE FIGURES

FIGS. 4A-4C show another embodiment of a missort prevention system associated with a chute;

FIGS. 6A-6C show another embodiment of a missort prevention system associated with a chute.

DETAILED DESCRIPTION OF THE INVENTION

The invention will be described below relative to certain illustrative embodiments, though those skilled in the art will recognize that the invention is not limited to the illustrative embodiments.

Figure 1:
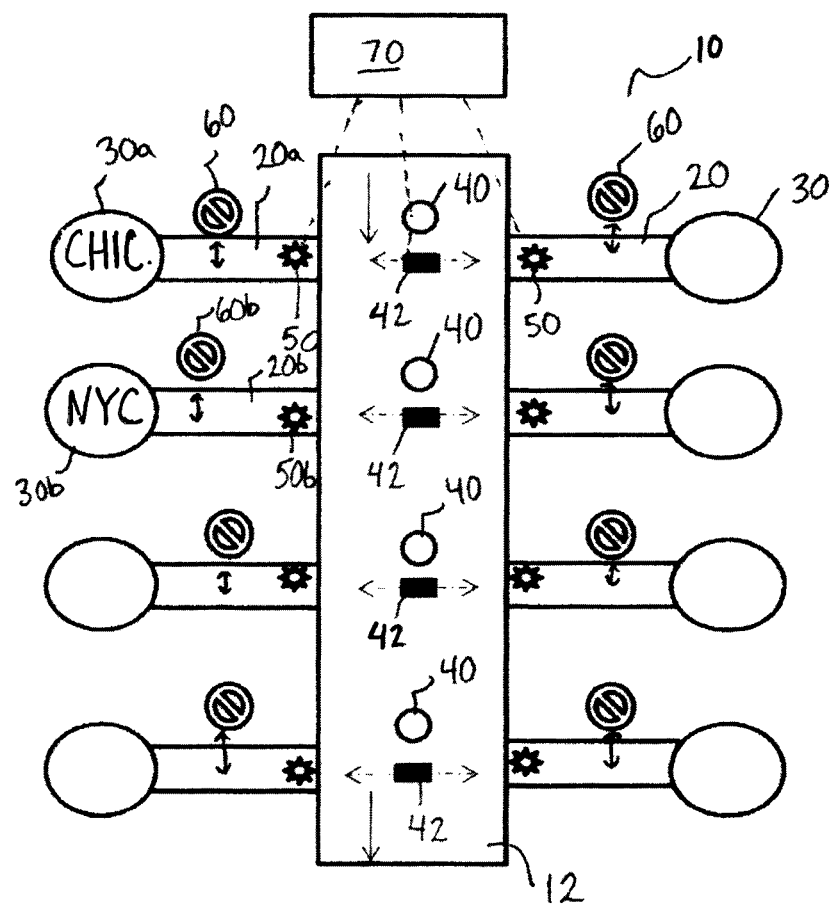
FIG. 1 is an overhead schematic view of a sortation conveying system of an embodiment of the invention.

FIG. 1 is an overhead view of a sortation system 10 for sorting conveyed articles into a plurality of collection devices. The sortation system includes a main conveyor 12 that conveys articles, such as packages, for sorting. The articles are sorted off onto chutes 20 depending on a predetermined characteristic, such as the final destination of the package. Collection devices, shown as bins 30, collect the sorted articles. At each sort location, a sorter 42 associated with the conveyor 12 receives a signal from a sort sensor 40 based on the predetermined characteristic and selectively deflects an article into an associated chute 20. A control system 70 controls the operation of the sortation system. The control system 70 for the sortation system 10 sends a signal to the sorter 42 to sort a selected article to a designated collection device via a chute 20. Any suitable sorter and sort sensor known in the art may be used. The illustrative conveyor is an ARB™ Switch S7000 conveyor available from Intralox, LLC of Harahan, La., though the invention is not so limited.

One or more chutes includes a missort prevention system for preventing missorted articles from accidentally passing to the wrong collection device. The missort prevention system includes a missort sensor 50 and a missort preventer 60. The missort sensor 50 produces a signal at a sort location to signal if and when a missort occurs. In the event of a missort, the missort preventer prevents the missorted article from passing into the collection device 30. The missort preventer 60 may stop the missorted article on the chute 20 or redirect the missorted article into a different collection device dedicated to missorted articles.

For example, a package intended for Chicago should pass down a chute 20a and into a collection device 30a associated with Chicago. If the sorter 42 on the conveyor malfunctions and sends the Chicago-bound package to another collection device 30b bound for New York, the missort sensor 50b associated with the chute 20b sends a signal indicative of the missort to activate a missort preventer 60b. In one embodiment, the missort sensor 50 may be a photoreflective or other sensor with two outputs (blocked or unblocked). The missort sensor may detect a missort by detecting the presence of an article in an associated chute that should not exist. For example, after the sort signal is sent by the control system 70 to a sorter 42, the control system expects that the missort sensor 50 for the associated chute will be blocked (by the article that is being sorted) within a certain time window following the sort signal. The time window is generally a short amount of time, for example, about one second. If a missort sensor 50 is blocked at any other time, the control system 70 recognizes that a missort has occurred and sends a signal that activates the missort preventer 60 associated with that chute. Alternatively, the reverse logic could be deployed. For example, the missort preventer is in a blocking mode as a default, except when a sorted article is supposed to be on the chute, in which case the missort preventer switches to a pass mode to allow the sorted article to pass down the chute.

Various embodiments of a chute in a sorting system with a missort prevention system are shown in FIGS. 2A-6C.

Figure 2A:
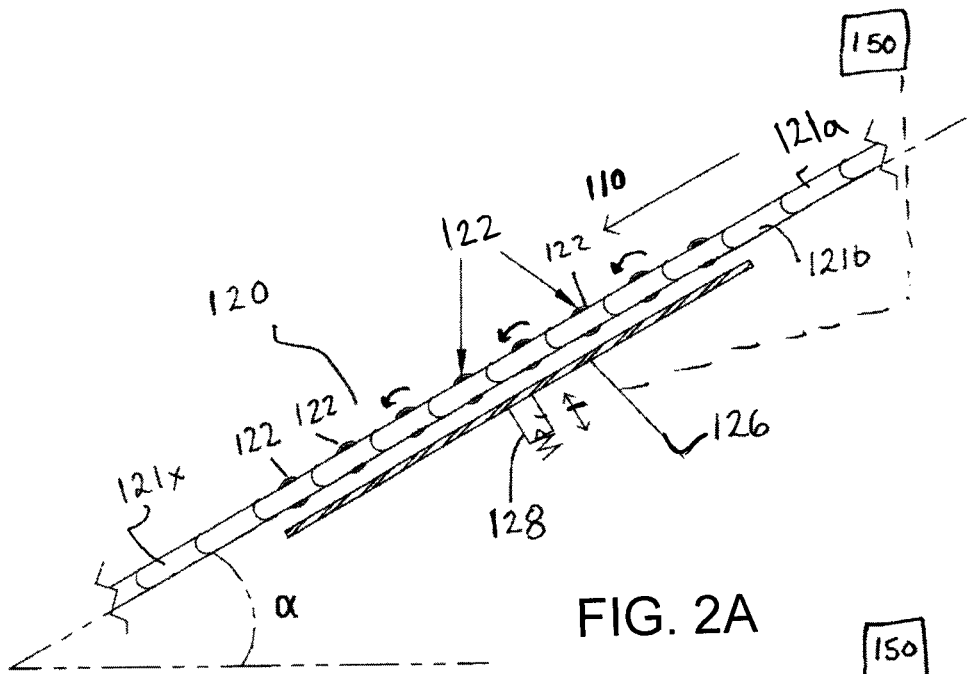
FIG. 2A is a side view of a chute for a sortation system including a missort preventer in a first position.
Figure 2B:
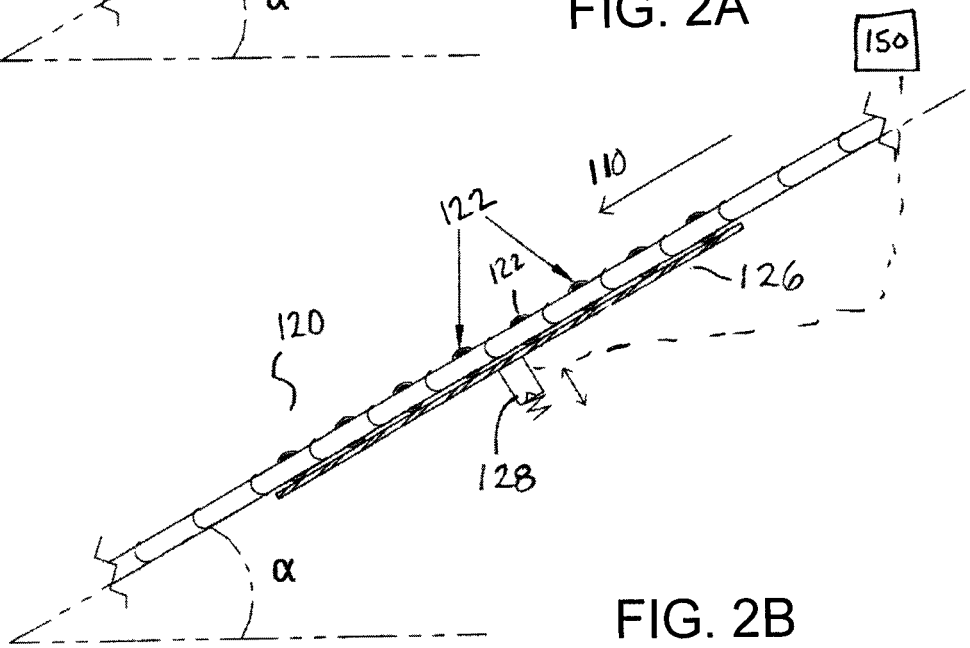
FIG. 2B shows the chute of FIG. 2B with the missort preventer in a second position.

FIG. 2A is a side view of a chute 120 for a sortation system including a missort preventer in a first position, in which the chute 120 passes articles into an associated collection device in a direction of travel 110 according to an embodiment of the invention. FIG. 2B shows the chute 120 in a second position, which blocks articles from passing down the chute. The illustrative chute comprises an array of free-spinning rollers 122 housed in modules 121a-121x to form a conveying surface extending from the top surface of the chute. The rollers 122 allow an article passed from an overhead conveyor to roll down the chute in travel direction 110. The modules 121a-121x are connected to create a chute 120 that angles downward from a main conveyor at an angle α relative to horizontal. However, the chute 120 may comprise any suitable device for conveying articles from a main conveyor to a collection device. A brake, shown as a pad 126 below the rollers 122, selectively engages one or more of the rollers 122 to create a braking effect that stops the rollers 122 from rotating and prevents articles from traveling further down the chute 120. When a missort sensor 150 detects the presence of an unexpected article, a controller signals the activator 128 for the pad 126, which raises the pad towards and into engagement with the rollers 122. The pad 126 locks the rollers and prevents the article from further sliding down the chute. The chute is not limited to a modular chute, and the rollers may be housed in any type of substrate suitable for allowing the passage of articles.

Figure 3A:
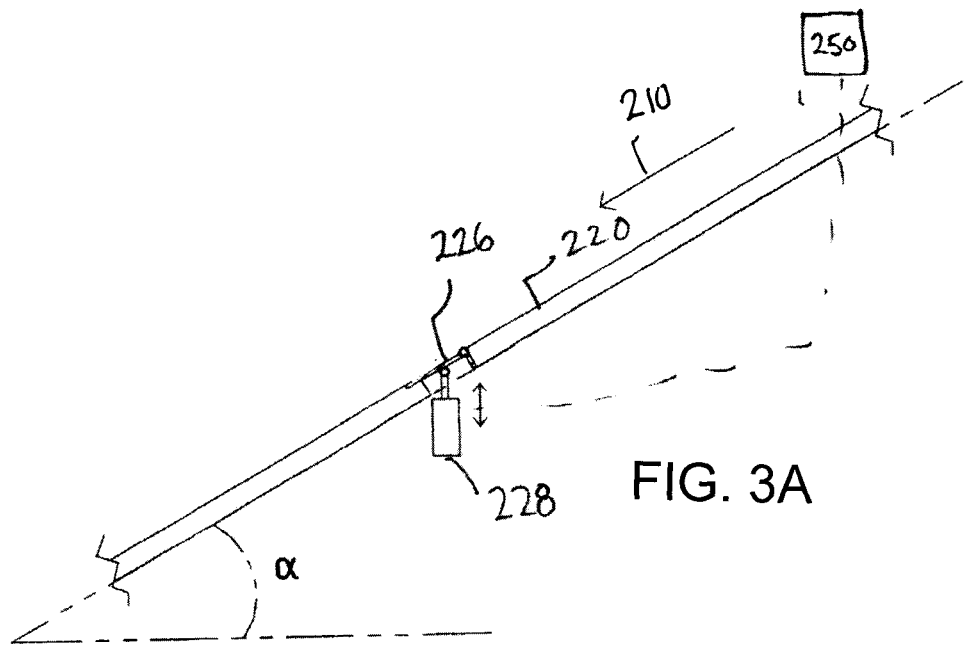
FIG. 3A is a side view of another embodiment of a chute including a missort preventer in a first position.
Figure 3B:
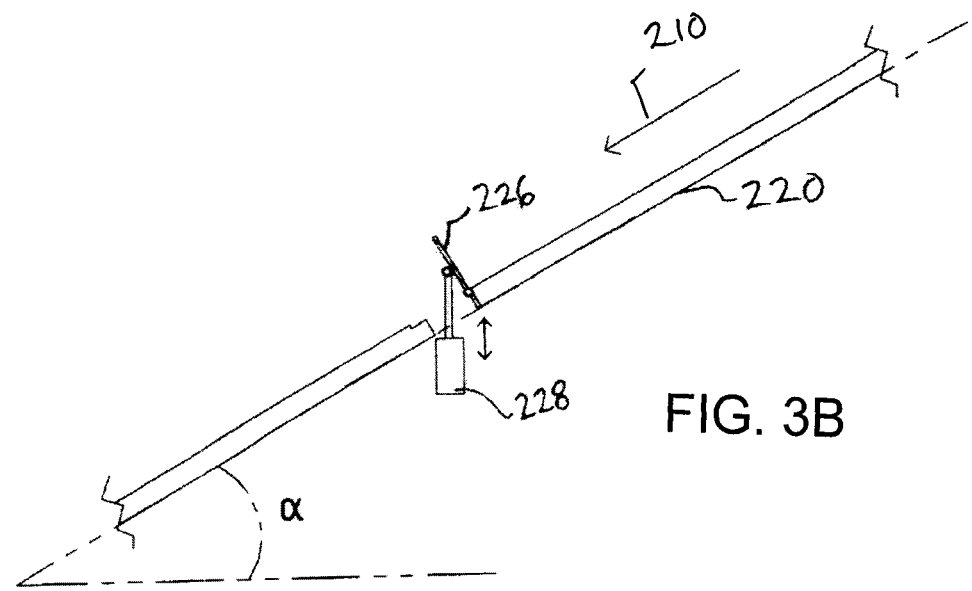
FIG. 3B shows the chute of FIG. 3A with the missort preventer in a second, blocking position.

FIG. 3A is a side view of another embodiment of a chute 220 including a missort preventer in a first position. FIG. 3B shows the chute 220 with the missort preventer in a second, blocking position. When open, the chute 220 allows articles to pass in a direction of travel 210 from an upper conveyor or sorter to a lower collection device. The chute 220 includes a hinged gate 226 at an intermediate location. When signaled by the missort sensor 250, an activator 228 pushes the gate 226 up into a blocking position, shown in FIG. 3B, to prevent the missorted article from passing further down the chute.

FIGS. 4A-4C show another embodiment of a missort prevention system associated with a chute 320. The chute 320 comprises a plurality of bricklaid modules 321 with rollers 322 housed in at least some of the modules 321 to form a platform extending downwards at an angle α from an upper conveyor to a collection device. The modules 321 may be connected through any suitable means, such as hinges, though the invention is not so limited. The missort preventer comprises a plurality of pop-up pins 330 that can be selectively activated by activators 336, based on a signal from a missort sensor, to block the chute 320 or redirect the article. During normal operation, article pass down the chute in a direction 310 of travel, but are blocked from passaged when a missort occurs. In the embodiment shown in FIGS. 4A-4C, the pop-up pins are arranged in a row within a row of modules. The pins 330 are disposed between adjacent rollers 322. However, the pins may have any suitable arrangement, configuration, location and number.

Figure 5A:
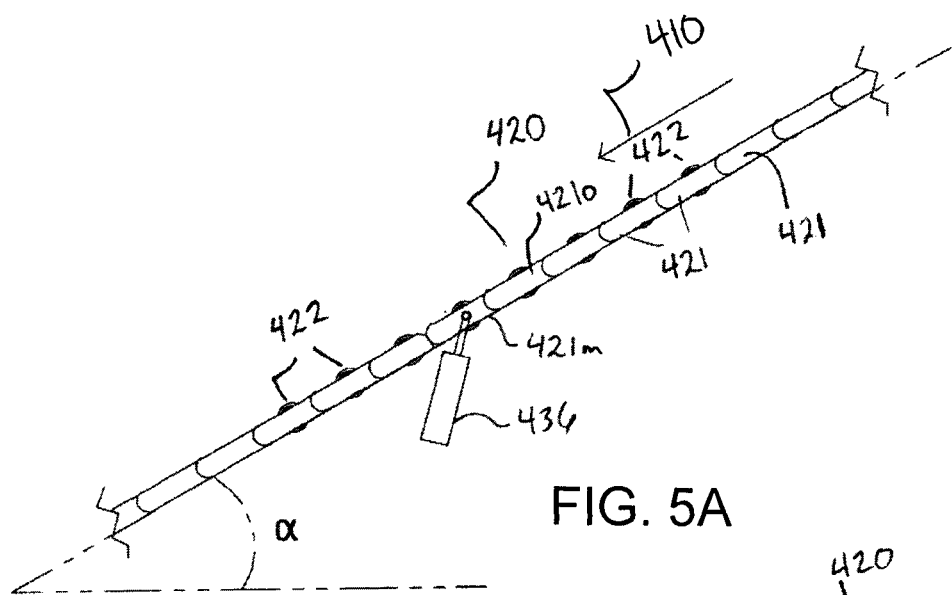
FIGS. 5A-5B show another embodiment of a missort prevention system associated with a chute.
Figure 5B:
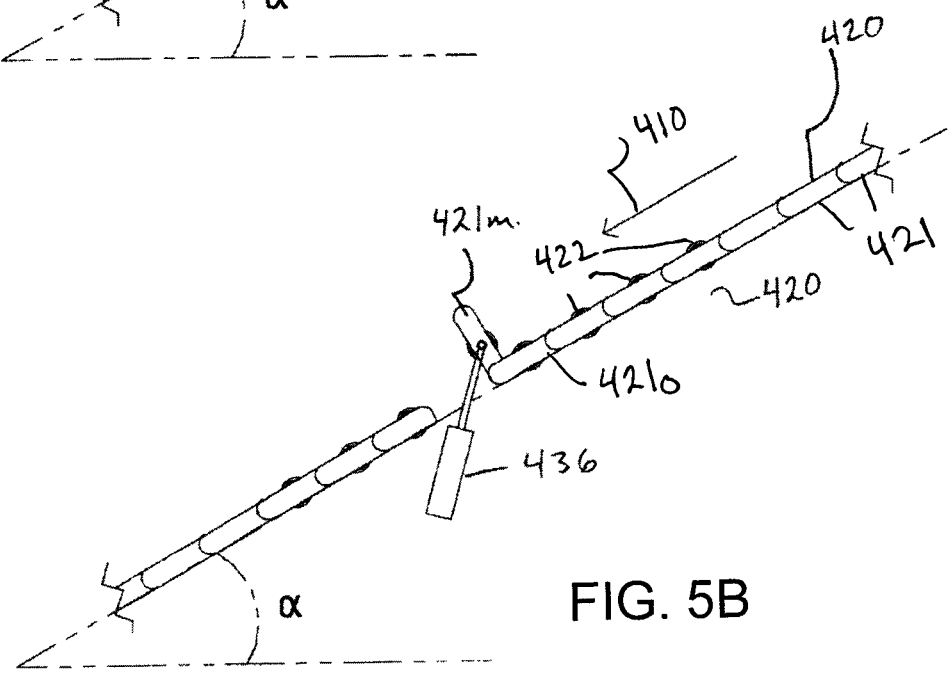

FIGS. 5A-5B show another embodiment of a missort prevention system associated with a chute 420. The chute 420 comprises a plurality of modules 421 connected together with rollers 422 housed in at least some of the modules to allow articles to pass in a direction 410. At least one module 421m or row of modules is movable relative to the other modules in the chute. For example, the illustrative module 421m is hinged to an adjacent module 421o at a first end and free at a second end to form a hinged gate. An actuator 436 selectively lifts the movable module to create a blockade along the chute 420. The blockade either stops or redirects a missorted article on the chute.

FIGS. 6A-6C show another embodiment of a missort prevention system associated with a chute 520. The missort prevention system includes an overhead mechanism 530 disposed along the chute 520. The overhead mechanism 530 includes a frame 531 and a movable gate 533. When a missort detector 550 detects a missort, a controller sends a signal to an activator in the overhead mechanism 530 to lower the gate 533 into the trajectory 510 of the article, blocking or diverting the article. The activator may raise the gate 533 to allow other articles to pass to the collection device associate with the chute 520.

A missort prevention system, which prevents missorted articles from reaching a collection device, may be used with any type of chute, and is not limited to the illustrative chutes, and is particularly not limited to chutes with rollers.

The invention has been described relative to certain illustrative embodiments, though those skilled in the art will recognize that modifications may be made without departing from the scope of the invention.

What is claimed is:

1. A method of preventing a missorted article from passing down a chute from a conveyor, comprising the steps of:
    sensing the presence of a missorted article on a chute by generating a missort signal when a missort sensor is blocked outside of a selected time window; and
    activating a missort preventer along the chute to block the missorted article.

2. The method of claim 1, wherein the step of activating a missort preventer comprises the step of braking rollers forming a surface of the chute.

3. The method of claim 1, wherein the step of activating a missort preventer comprises the step of lifting a hinged gate to block the missorted article on the chute.

4. The method of claim 1, wherein the step of activating a missort preventer comprises the step of raising a barrier through the chute to create a blockade on the chute.

5. The method of claim 1, wherein the step of activating a missort preventer comprises the step of lowering a gate over the chute to create a blockade on the chute.

6. A conveying system for sorting articles, comprising:
    a conveyor for conveying articles in a direction of travel;
    a first chute extending at an angle down from the side of the conveyor for receiving articles sorted off of the conveyor;
    a missort sensor associated with the chute for generating a signal indicating a missort when the missort sensor is blocked outside of a selected time window; and
    a missort preventer for selectively blocking the chute when the missort sensor generates a signal indicating a missort.

7. The conveying system of claim 6, wherein the missort sensor is a photoreflective sensor.

8. The conveying system of claim 6, wherein the first chute includes a plurality of rollers forming a conveying surface, and the missort preventer comprises a brake that selectively engages the rollers to prevent rotation of the rollers.

9. The conveying system of claim 6, wherein the missort preventer comprises a hinged gate that is selectively raised to form a blockade on the chute.

10. The conveying system of claim 6, wherein the missort preventer comprises a plurality of pins pushed through the chute to form a blockade on the chute.

11. The conveying system of claim 6, wherein the missort preventer comprises a gate in a frame that is selectively lowered to form a blockade on the chute.

12. A method of sorting articles, comprising the steps of:
   directing the articles along a path of travel with a conveyor;
   detecting the presence of a characteristic of the articles;
   directing articles with a first characteristic from the conveyor to a first chute;
   generating a missort signal when a missort sensor is blocked outside of a selected time window; and
   blocking the first chute if the missort sensor is blocked outside of a selected time window.

* * * * *